United States Patent Office 3,486,427
Patented Dec. 30, 1969

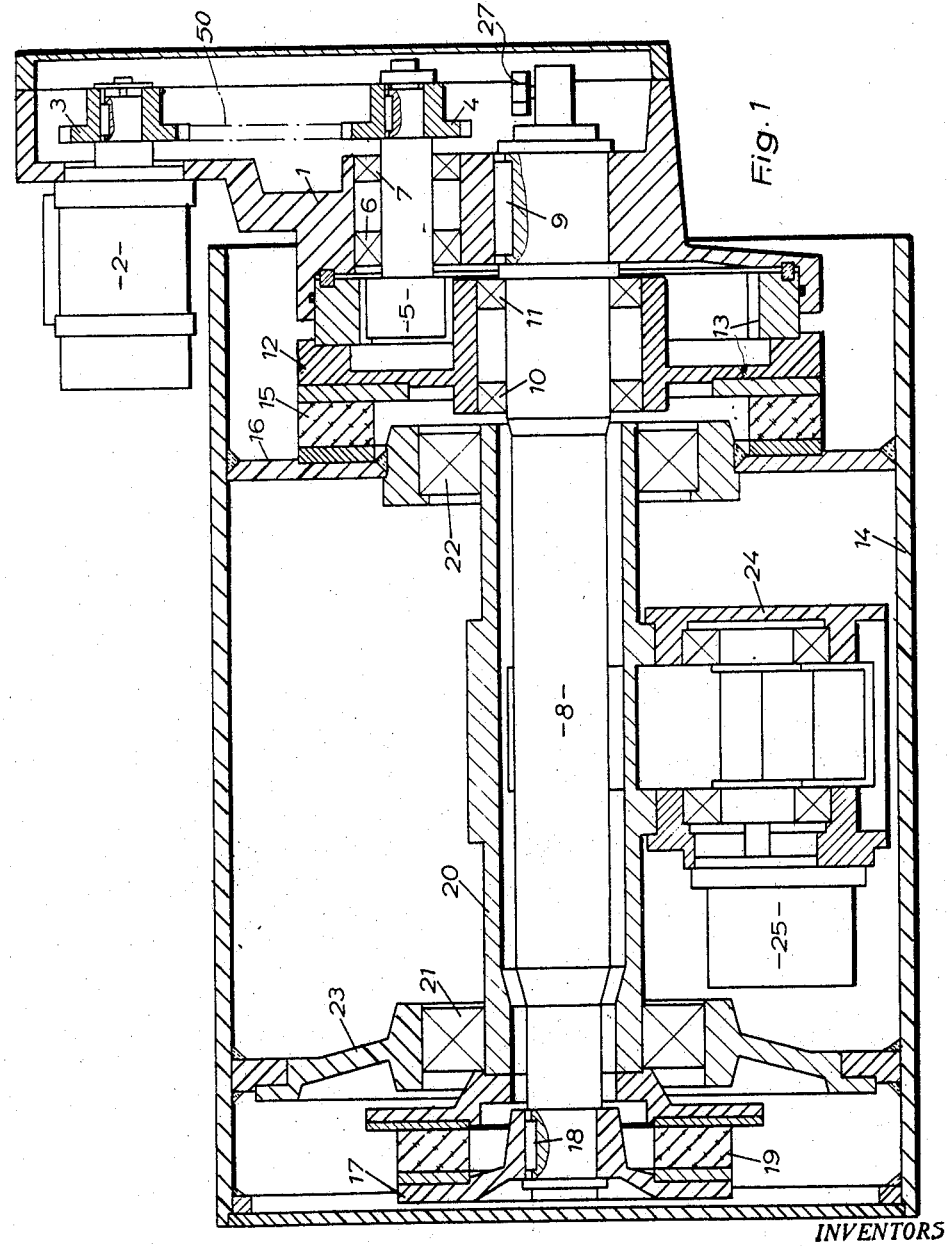

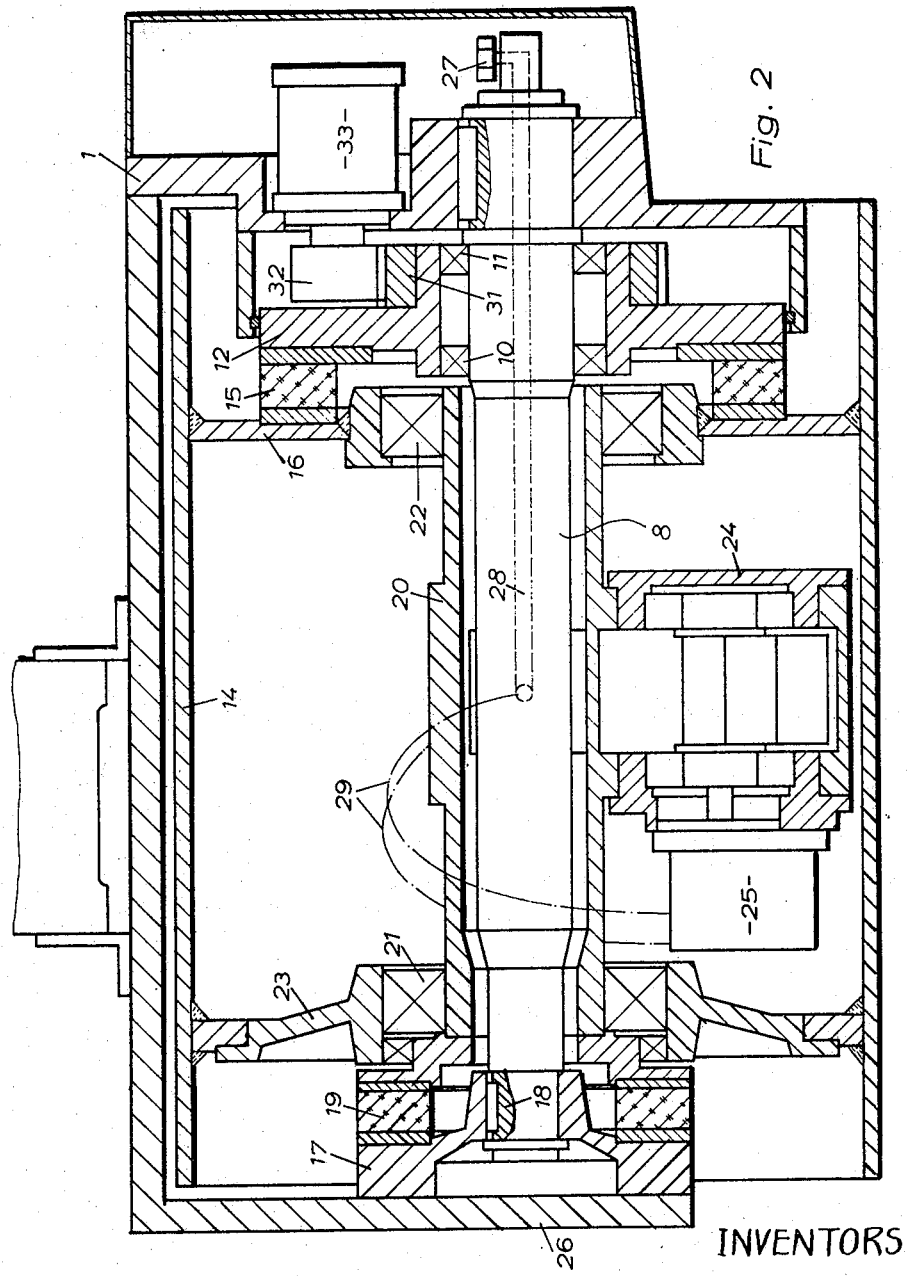

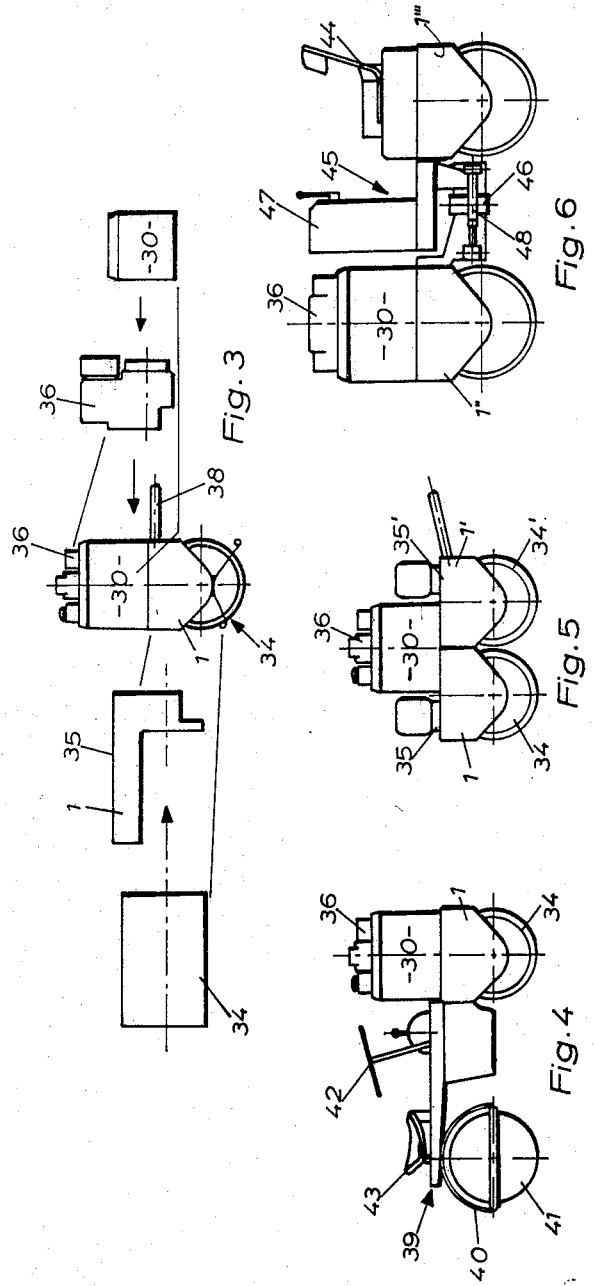

3,486,427
VIBRATORY ROLLERS
Hans-Georg Waschulewski, Dusseldorf, Helmut Erdmann, Wattenscheid-Hontrop, and Gunther Laimann, Dusseldorf, Germany, assignors to Losenhausen Maschinenbau Aktiengesellschaft, Dusseldorf-Grafenberg, Germany
Filed Mar. 12, 1968, Ser. No. 712,456
Claims priority, application Germany, Mar. 10, 1967,
L 55,971
Int. Cl. E01c 19/28
U.S. Cl. 94—50         11 Claims

ABSTRACT OF THE DISCLOSURE

Vibratory roller with a locating frame having a shaft, rigidly mounted thereon and in which a sleeve, disposed coaxially on the rigid shaft and excited by an unbalance to execute vibrations, is supported in the end plates of the roller drum, characterized in that said sleeve is connected to the rigid shaft by means of torsionally stressed resilient intermediate members and an unbalance vibrator, constructed as gyratory vibrator, is provided on the said sleeve and below thereof.

---

The invention relates to a vibratory roller with a locating frame having a shaft which is rigidly mounted thereon and in which a sleeve, disposed coaxially to the rigid shaft and excited by an unbalance to produce vibrations, is supported in the end plates of the roller drum.

In a known system the sleeve represents a rotating unbalance. Accordingly, gyratory vibrations are generated of which however only the vertical components are utilised for compacting while the unutilised horizontal components also act on the roller drum and unnecessarily stress the system.

The prior art also discloses a system with a directional vibrator, disposed in the roller drum and suspended below the roller shaft. Such a system relates to an unbalance vibrator with two counter-rotating unbalances which are driven via pinions by the rotating roller shafts. In such a system there is the problem of transmitting the vibrator drive from the prime mover to the vibrating roller. Moreover, the vibrator is relatively complicated.

The prior art discloses so-called "oscillating vibrators." These are gyratory vibrators with centrifugal weights rotating about a first shaft, the housings being rotatably journalled on a second shaft outside the first shaft and being resiliently restrained to a static position. In a known oscillating vibrator restraint is applied for example by an anti-vibration ring mount, disposed coaxially relative to the aforementioned second shaft. In such an oscillating vibrator, that component of the centrifugal force positioned in the common plane of the aforementioned first and second shaft (circulating and oscillating axis) is transmitted via the housing suspension system to the body on which the vibrator is mounted. The centrifugal force component acting perpendicularly thereto effects an oscillating motion of the vibrator about the oscillating axis, said component being absorbed by the resilient restraint means. An object of the invention is to provide a vibratory roller which operates with oriented vibrations.

A further object of the invention is to provide a vibratory roller, having oriented vibrations, with the least possible technical effort.

It is a still further object of the invention to support a locating frame resiliently on a roller drum.

It is another object of the invention to provide the travelling and vibrator transmission on the vibrating roller drum.

It is another object of the invention to provide a range of different roller types with the least possible manufacturing effort.

To this end, the invention provides that the aforementioned sleeve is connected to the rigid shaft by means of torsionally stressed resilient intermediate members and an unbalance vibrator, constructed as a gyratory vibrator is provided on said sleeve and below thereof.

The vibrator functions as an oscillating vibrator so that only the vertical centrifugal force components become effective on the roller drum while the horizontal centrifugal force components result in an oscillating motion of the vibrator and in a gyratory vibration of the sleeve and do not become effective on the roller drum.

It is advantageous if the unbalance vibrator is driven by a motor mounted directly thereon and connected via flexible energy supply lines to an energy source.

To this end, the invention may be so performed that the shaft is mounted in known manner on the locating frame, that the shaft is provided at its free end with a radial flange and that said radial flange is connected to a radial flange of the sleeve via an annular rubber member.

In this way, the resilient intermediate members, in this case in the form of an annular rubber member, fulfill a dual purpose: on the one hand they restrain the "oscillating vibrator" while on the other hand the shaft, which is fixed relative to the locating frame, is resiliently supported via said rubber member and accordingly is resiliently supported on one side in the roller drum. In a further embodiment, the travelling transmission of the roller drum and the resilient support on the other side may be provided by a driving pulley being rotatably journalled on the rigid shaft on that side at which the shaft is mounted on the locating frame, the driving pulley being coupled via an annular rubber member to the adjacent roller end plate and the driving pulley being in transmissive coupling with a motor disposed on the locating frame. The drive is therefore provided in known manner via resilient members which absorb the vertical relative motions between the vibrating roller drum and the substantially static locating frame.

In a further embodiment of the invention, the system may be so arranged that the roller drum is individually supported in a locating frame representing a separate structural part and having at the top a plane mounting surface and being adapted for combination in the horizontal direction with different locating frames and in the vertical direction with different superstructures for the provision in unit construction manner of different roller types. Accordingly, the system offers facilities for providing in unit construction manner and with only a few basic elements a range of different roller types.

This offers a substantial simplification and cost reduction in manufacture.

For example, the mounting surface may be so utilised that a prime mover and a hydraulic unit may be mounted thereon, said hydraulic unit being in transmissive coupling with the prime mover and containing in a totally enclosed structural unit an oil tank, a pump, for delivering hydraulic oil, as well as hydraulic control members and that the travelling and vibrator drive is provided by separate hydraulic motors supplied with hydraulic fluid by the hydraulic unit.

To this end, a vibratory roller may be so constructed that two identical locating frames are arranged serially and are coupled to each other and that the prime mover and the hydraulic unit for both roller drum subassemblies are together mounted in the middle partly on the mounting surface of one locating frame and partly on that of the other. It is also possible for two identical locating frames to be coupled via a hydraulically adjustable joint, that one of the locating frames is provided on its mounting surface with the prime mover as well as with the hydraulic unit while a driver's seat is mounted on the other locating frame. Finally, a drawbar may be mounted on a locating frame with a roller drum adapted to support the prime mover and the hydraulic unit.

It will be clear that the unit construction system of vibratory rollers of the kind heretofore described can also be applied to other roller systems in which the vibrations are not generated by an oscillating gyratory vibrator in the manner theretofore described. In particular and where appropriate it is possible for individual rollers to be constructed without vibration generators but with the locating frame being the same in all other respects.

Embodiments of the invention will now be described by way of example with reference to the drawings in which:

FIGURE 1 is a section through a roller drum and part of the locating frame;

FIGURE 2 shows a further embodiment;

FIGURE 3 shows in diagrammatic form a side elevation of a vibratory roller constructed in accordance with the invention together with a roller drum and sub-assemblies from which it is constructed;

FIGURES 4, 5 and 6 also show in diagrammatic form and in side elevation different types of vibratory rollers, constructed while substantially utilizing the same sub-assemblies as the roller illustrated in FIGURE 3.

In the construction shown in FIGURE 1, a motor 2 is mounted on a frame 1. The motor 2 drives a pinion 5 via a chain transmission 50 with the sprockets 3 and 4. The pinion 5 and the sprocket 4 are journalled in bearings 6 and 7 of the vehicle frame. A stationary shaft 8, keyed at 9 to the frame 1, is mounted on the vehicle frame. A disc-shaped part 12 is rotatably journalled on bearings 10 and 11 on shaft 8, said disc-shaped part having a ring affixed thereto, which ring has an internal gear tooth system 13. The internal gear tooth system 13 is in mesh with the pinion 5.

A roller drum 14 is in transmissive coupling with the disc-shaped part 12 via an annular anti-vibration member 15 mounted on one side of the disc-shaped member 12 and on the other side on an intermediate wall 16 of the roller drum. A disc-shaped member 17, keyed at 18 to the shaft, is mounted at the end of shaft 8. Said member is coupled via an anti-vibration member 19 to a sleeve 20 which surrounds the shaft 8. The roller drum 14 with the intermediate wall 23 and the intermediate wall 16 is journalled by means of bearings 21, 22 on the sleeve 20. The sleeve 20 is therefore substantially stationary and resiliently restrained in the static position by the anti-vibration member 19. A gyratory vibrator 24, driven by a motor 25, is disposed below, and secured to (by means not shown), the sleeve 20.

Due to the effect of the centrifugal forces of the gyratory vibrator said vibrator together with the sleeve 20 executes a reciprocating vibration, thus causing the anti-vibration member 19 to be torsionally stressed. Accordingly, the horizontal components are absorbed in the same way as in a reciprocating vibrator. The vertical components of the centrifugal force however act upon the roller 14 via the sleeve 20 and the bearings 21 and 22. Owing to the effect of the aforementioned forces the roller executes vertical vibrations relative to the roller frame 1, said vibrations being made possible by virtue of the anti-vibration mounts 15 and 19.

The anti-vibration mounts 15 and 19 in this construction fulfil a plurality of functions:

(a) The anti-vibration mounts 15 and 19 provide a resilient coupling between the roller frame and roller to permit vertical vibrations of the roller 14.

(b) The anti-vibration mount 15 provides for the resilient transmission of the driving torques from the motor to the roller thus avoiding shock starting.

(c) The anti-vibration mount 19 provides torsionally resilient restraint of the reciprocating gyratory vibrator 24 and thus producing orientated vibrations in accordance with the reciprocating vibrator effect.

The construction according to FIGURE 2 is similar to that according to FIGURE 1 and the same reference numerals are used for corresponding parts in both figures. In the embodiment illustrated in FIGURE 2, the shaft 8 is not only supported on one side. By contrast, the locating or positioning frame 1 is provided with a side plate 26 on which the disc-shaped body 17 is secured. The motor 25 is a hydraulic motor and has supply and discharge ducts for the pressure medium said ducts being in communication via connections 27, and channels 28 in the shaft 8 and via flexible hose connections 29 with a hydraulic unit 30 (FIGURES 3 to 6). The hose connections 29 extend through openings in the sleeve 20 to permit said sleeve to execute vibrating motions.

For travelling, the boss of the disc shaped part 12 is provided with a gear ring 31 having an external gear tooth system with which a pinion 32, journalled in the locating frame 1, meshes. The pinion 32 is mounted directly on the shaft of a hydraulic motor 33 which is also driven by the hydraulic unit 30.

FIGURE 3 discloses the manner in which the vibratory roller is assembled in unit construction manner on different sub-assemblies. The roller drum together with the shaft 8 represents a sub-assembly 34 while a second sub-assembly is formed by the locating frame 1. The locating frame 1 is adapted to accommodate a single roller drum unit 34 as disclosed in FIGURE 3. It has a horizontal plane mounting surface 35 and is adapted, by means of screw holes or the like, for the mounting of other assemblies at the top of the mounting surface 35 and for combination, including in the horizontal direction, with other sub-assemblies, in particular another locating frame. A prime mover 36, such as an internal combustion engine, and the hydraulic unit 30 are mounted adjacently on the mounting surface 35 as illustrated in FIGURE 3, these units representing further sub-assemblies in the system. The hydraulic unit incorporates an oil tank, a pump and hydraulic control elements. It supplies hydraulic fluid for driving the hydraulic motors for the vibrator and travelling transmission, where appropriate for a plurality of roller drums as well as for any hydraulic steering systems 37 (FIGURE 6).

In the embodiment illustrated in FIGURE 3 a single locating frame 1 is connected to a drawbar 38. In FIGURE 4 the same system, incorporating the roller drum unit 34, the locating frame 1, the engine 36 and the hydraulic unit 30, is combined with a different kind of locating frame 39 having a roller steering frame 40 with a steered roller 41, a steering wheel 42 and a driver's seat 43.

In the embodiment illustrated in FIGURE 5, two identical locating frames 1, 1' are directly coupled to roller drum units 34, 34'. A prime mover 36 and a hydraulic unit 30 are mounted on the common mounting surface 35, 35' which is common to both locating frames and roller drums. The hydraulic unit is connected to the connections 27 and the motors 2 (FIGURE 1) or 33 (FIGURE 2) via hoses or other ducts which do not interfere with the design. A duplex vibratory roller is thus obtained.

FIGURE 6 shows a further roller which can be constructed by utilising the sub-assemblies described hereinabove. In this case, a first locating frame 1" and a second locating frame 1''' is provided, each being supported on a roller drum unit 34" or 34'''. The engine 36 and the hydraulic unit 30 are mounted on the locating frame 1" in the same way as in FIGURE 3. A driver's seat 44 is mounted on the locating frame 1''''. The two locating frames 1" and 1''' are coupled to each other via a steering unit 45 with a jointed link 46, a control panel 47 and a hydraulic steering system 48.

We claim:
1. A vibratory roller apparatus comprising:
   a frame member;
   a stationary shaft member rigidly secured to said frame member;
   a rotationally stationary sleeve about the shaft member and coaxial therewith;
   mounting means at one end of the shaft and sleeve and coupling the shaft and one of said members to restrain the sleeve against significant rotation and to support said one end of the sleeve in coaxial relation to said one end of the shaft member, said mounting means including a resilient portion for permitting vibration of the one end of said sleeve with respect to the members;
   a roller drum rotatably mounted on the sleeve;
   drive means rotatably mounted on a first of the members and positioned about the shaft member adjacent the other end thereof and coupled to the drum to rotate the drum, said drive means including a resilient portion for permitting vibration of the drum with respect to said members;
   power means connected to the drive means to rotate the drive means and drum; and
   a gyratory vibrator device mounted on the sleeve and positioned below said sleeve for vibrating the sleeve and drum.

2. An apparatus as set forth in claim 1, wherein
   said sleeve has an opening therethrough; and
   said device includes a motor mounted directly thereon and power supply lines connected to the motor and extending through said opening and along said shaft member to a position externally of said members.

3. An apparatus as set forth in claim 2, wherein said shaft member is cantilever mounted to said frame member and is attached to the frame member only at the other end of the shaft member with said one end being unsupported, said mounting means including a first radial flange attached to said shaft member and a second radial flange attached to the sleeve, said resilient portion of the mounting means comprising an annular rubber member connecting the radial flanges.

4. An apparatus as set forth in claim 3, wherein
   said drum includes a radial wall adjacent the drive means; and
   said drive means includes a disc shaped part journaled on said shaft member, said resilient portion of the drive means comprising an annular rubber member connecting said radial wall and said disc shaped part.

5. An apparatus as set forth in claim 4, wherein
   said drive means includes a ring gear having teeth and rotatable about said shaft and a spur gear having teeth engaging said ring gear teeth and rotatably mounted in said frame member, and
   including sealing means between said frame member and said drive means and enclosing the space in which said teeth are located.

6. An apparatus as set forth in claim 1, wherein said shaft member is cantilever mounted to said frame member and is attached to the frame member only at the other end of the shaft member with said one end being unsupported, said mounting means including a first radial flange attached to said shaft member and a second radial flange attached to the sleeve, said resilient portion of the mounting means comprising an annular rubber member connecting the radial flanges.

7. An apparatus as set forth in claim 6, wherein
   said drum includes a radial wall adjacent the drive means; and
   said drive means includes a disc shaped part journaled on said shaft member, said resilient portion of the drive means comprising an annular rubber member connecting said radial wall and said disc shaped part.

8. An apparatus as set forth in claim 7, wherein
   said drive means includes a ring gear having teeth and rotatable about said shaft and a spur gear having teeth engaging said ring gear teeth and rotatably mounted in said frame member, and
   including sealing means between said frame member and said drive means and enclosing the space in which said teeth are located.

9. An apparatus as set forth in claim 2, wherein said shaft member is secured at both ends thereof to said frame member.

10. An apparatus as set forth in claim 1, wherein said shaft member is secured at both ends thereof to said frame member.

11. An apparatus as set forth in claim 1, wherein
    said drive means includes a ring gear having teeth and rotatable about said shaft and a spur gear having teeth engaging said ring gear teeth and rotatably mounted in said frame member, and
    including sealing means between said frame member and said drive means and enclosing the space in which said teeth are located.

References Cited

UNITED STATES PATENTS

| | | | |
|---|---|---|---|
| 2,671,386 | 3/1954 | Kerridge | 94—50 |
| 2,873,656 | 2/1959 | Andersson | 94—50 |
| 3,225,669 | 12/1965 | Green | 94—50 |

FOREIGN PATENTS

| | | |
|---|---|---|
| 246,199 | 9/1960 | Australia. |
| 934,932 | 8/1963 | Great Britain. |

JACOB L. NACKENOFF, Primary Examiner